Nov. 8, 1960
C. J. FRANCH
2,959,050
NEEDLE VALVE TEST INSTRUMENT
Filed April 17, 1959
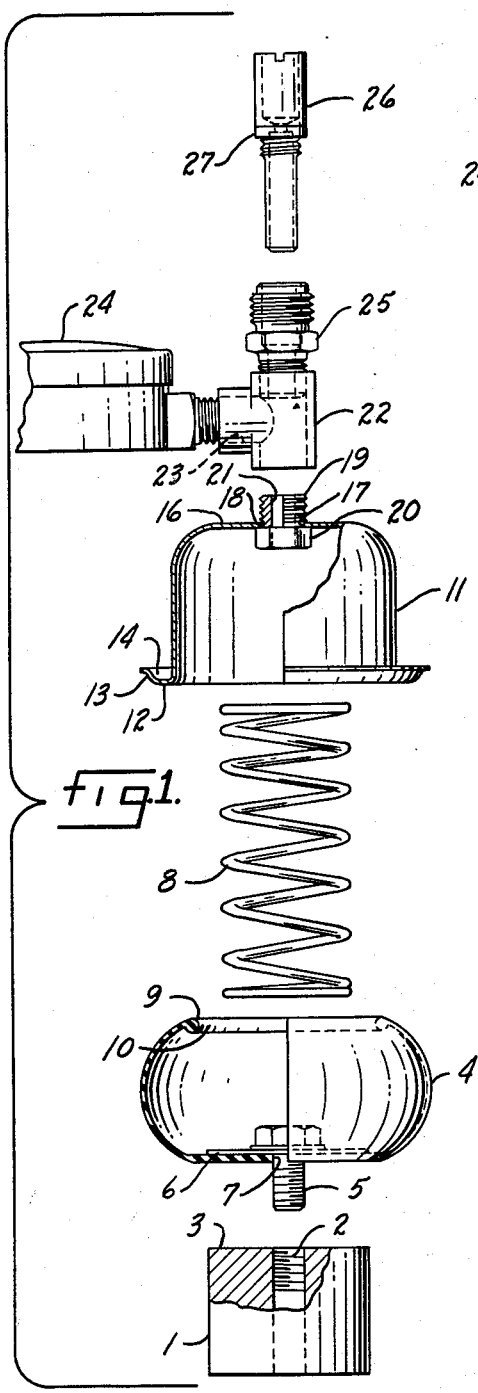
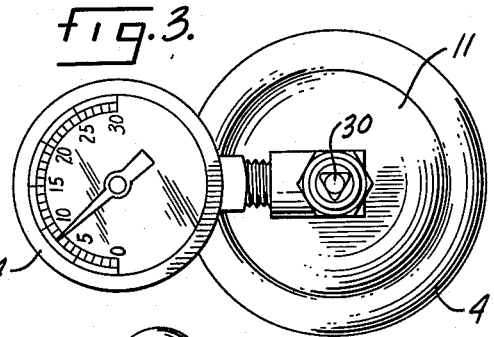
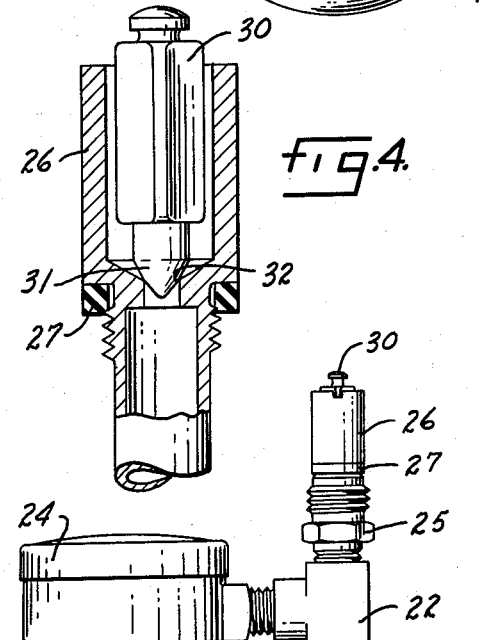
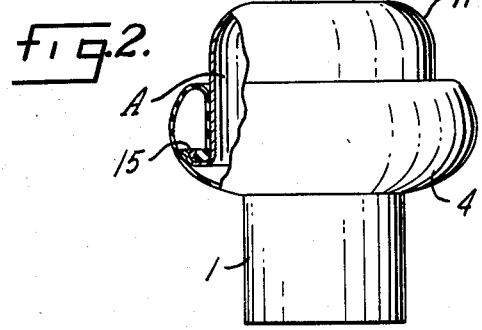
INVENTOR.
Charles J. Franch,
BY Parker & Carter
Attorneys.

United States Patent Office 2,959,050
Patented Nov. 8, 1960

2,959,050

NEEDLE VALVE TEST INSTRUMENT

Charles J. Franch, Chicago, Ill., assignor to Sheridan Park Mfg. Co., Inc., Chicago, Ill., a corporation of Illinois Filed Apr. 17, 1959, Ser. No. 807,058

4 Claims. (Cl. 73—46)

This invention relates to testing devices and has as one purpose to provide an effective test instrument for valves and valve seats.

Another purpose is to provide a test instrument of maximum simplicity and effectiveness in testing the efficiency of carburetor valves and the like.

Another purpose is to provide a testing device of minimum parts and maximum ease in manufacture which shall be effective to provide a rapid and positive test of the ability of a valve-and-seat combination to hold pressure.

Another purpose is to provide a method of testing valves and valve seats.

Another purpose is to provide a manually operable device effective to test valve-and-valve seat combinations.

Other purposes will appear from time to time in the course of the specification and claims.

I illustrate my invention more or less diagrammatically in the accompanying drawings wherein:

Figure 1 is an exploded view of the assembly of parts in half-section,

Figure 2 is a side elevation of the assembly in compressed condition, with parts in section, Figure 3 is a top plan view of Figure 2, and Figure 4 is a detail view in partial cross-section and illustrating a valve.

Like parts are indicated by like numerals throughout the specification and drawings.

Referring now to the drawings herein and particularly to Figure 1, numeral 1 indicates a base or support member which may take the form of a substantial block of metal or the like. The base 1 has a threaded well 2 and a generally flat upper surface 3 from which the well 2 descends.

An upwardly-open cup-like element 4 is formed of a material having the properties of rubber and is secured to the surface 3 of base 1 by a bolt or other securing means 5.

I illustrate the bolt 5 as passing through a holding plate or comparatively large washer 6 positioned on the upper surface of the bottom wall of member 4. The bolt 5 passes through the plate 6, through an aperture 7 in the bottom wall of member 4 and threadably engages the well 2. A relatively strong spring 8 has one of its ends seated upon the upper surface of plate 6. The spring 8 is dimensioned to expand to a point above the upper open end of member 4. Member 4 has its upper open end inwardly turned, as indicated at 9, to provide a downwardly disposed, circumeferential upper edge or lip 10.

A closure for member 4 is formed of relatively rigid material, such as metal, and is indicated generally at 11. The member 11 may be formed and positioned as a downwardly-open, cup-shaped member having its open, downward edge outwardly curved or flanged as at 12 and the thus annularly positioned flange 12 has its outer edge bent upon itself as at 13, the portions 12, 13 forming an annular, upwardly-open channel 14 in which the lip 10 of member 4 is positioned. The lip 10 of member 4 is sealed to member 11 by any suitable sealing material such as an effective glue within the channel 14 formed by portion 12, 13, the sealing material being indicated at 15.

The member 11 has its upper, generally horizontal wall 16 apertured as at 17, the aperture 17 having threads 18 formed therein. Threadably engaged with an penetrating the aperture 17 is a half-union fitting 19. The fitting 19 may have a securing element 20 engaging its lower end, as the parts are shown on the drawings, within member 11 and abutting the under-surface of wall 16 about aperture 17 therein.

The fitting 19 has a central passage 21 communicating with the area within, or chamber formed by, the sealed members 4, 11, the chamber being indicated at A in Figure 2. A T-fitting 22 has a branch extension having a passage 23 therein, the passage 23 communicating with passage 21 (and thus with chamber A) and with the area within an indicator member 24. The indicator 24 may comprise any suitable pressure gage having the well known visible dial and needle movable thereover, the indicator 24 being controlled by and displaying the pressure condition within passage 21 and thus within the chamber A formed by members 4, 11.

A union fitting 25 has an upwardly-open, inwardly-threaded upper portion into which a valve seat member 26 may be removably positioned, a seal or gasket 27 being illustrated as positioned between valve seat member 26 and fitting 25.

It will be understood that, whereas I illustrate, for convenience, a valve seat member 26 of a particular size in the drawings herein, the valve seat member to be tested, which may take a plurality of forms, is intended to be secured to fitting 25 in communicative relationship with, and to prevent the valve seat to, passage 21 and thus to place the valve seat of the valve seat member to be tested in communication with the chamber A and indicator 24. For purposes of accommodating valve seat members of a variety of sizes, a suitable adapter (not shown), may be secured to fitting portion 25 and the valve seat member to be tested may then be secured to the adapter.

The valve pin 30 to be tested is loosely positioned within valve seat member 26 and has its valve face 31 resting, in response to gravity alone, on valve seat 32 of valve seat member 26.

Whereas I have described and claimed a practical and operative device, nevertheless, many changes may be made in the size, shape, number and disposition of parts without departing from the spirit of my invention. I therefore wish my description and drawings to be taken as in a broad sense, illustrative or diagrammatic, rather than as limiting me to my precise showing.

The use and operation of my invention is as follows:

I illustrate a testing device comprising the elements designated as a support 1, a vacuum-creating member formed by elements 4, 11 and spring 8 and a fitting and indicator element formed by members 19, 22 and 24.

In the operation of my invention, it will be understood that the valve seat member and valve to be tested are mated elements manufactured and sold as a unit, it being intended that the valve surface and valve seat be capable, when the valve is on its seat, of withstanding particular predetermined pressures before opening. The operator, in the use of my invention, first positions the valve seat member and valve to be tested, such as the member 26 and valve 30, in place in the fitting 25. The operator then simply presses manually downwardly upon wall 16 of member 11. In so doing, the operator distorts by compression the spring 8 and flexible member 4, bringing the member 11 downwardly to a point adjacent the support 1. When this is done, the pressure expelled from the chamber A formed by members 4, 11 passes through passage 21 and escapes through valve seat 32 about valve surface 31, the resistance thereto being simply the weight of valve member 30 which is insufficient to prevent the escape of pressure from chamber A.

The operator then simply releases manual pressure from member 11 and spring 8 is of sufficient strength to move member 11 upwardly and to thereby create a vacuum or a suction within chamber A. The suction within chamber A is communicated through passage 21 to valve seat 32 and to valve surface 31 thus causing the valve member 30 to move downwardly or inwardly and to draw valve surface 31 tightly against its seat 32.

In thus drawing a vacuum within chamber A and in passages 21, 23 the indicator 24 is caused to indicate the amount of vacuum thus created. If the valve seat 32 and valve surface 31 are properly mated for efficient valving action, the indicator will disclose the presence of a substantial vacuum, on the order of ten pounds for example, within chamber A and passages 21, 23. A properly mated valve and valve seat is thereafter effective to hold such vacuum for a substantial period of time. In that event the operator, having thus determined that the valve and valve seat member are properly mated and may be employed for their desired function in the mechanism for which they were created, simply manually lifts the valve member off its seat 32 thus releasing the vacuum and permitting atmospheric air, to enter chamber A, and satisfy the vacuum in, chamber A through passage 21 and valve seat 32, the spring 8 thereby completing its upward action to return the member formed by elements 4, 11, to normal position.

On the other hand, if the valve 30 and seat 32 are not properly mated for effective valving action, upon release by the operator of downward pressure upon member 11 the spring 8 is able to draw air about seat 32 and to return the member formed by elements 4, 11 to its normal position providing practically no indication on indicator 24.

It will be realized that an accurate and reliable testing of the valve and valve seat member to be tested is provided by the device of my invention. As is well known, the ability of the valve to withstand a given amount of vacuum is indicative of its abilty to withstand a substantially greater amount of pressure. This relationship being known, the ability of the valve tested by the device of my invention to withstand or hold the vacuum indicated by indicator 24 gives an accurate measurement of its effectiveness to withstand pressures. Further, with a particular valve and valve seat combination, the indicator 24 will be caused to indicate a given vacuum immediately upon release by the operator of downward pressure upon wall 16. Almost immediately thereafter, in the case of a leaking valve, the indicator 24 will disclose a gradual dropping-off of such vacuum indicating a leak about valve seat 32 and the rapidity with which such vacuum is dissipated, and with which the indicator 24 is thus caused to drop gives an accurate indication of the extent of such leak.

I claim:

1. A testing device comprising a pair of chamber-forming elements, each of said elements being cup-shaped, said elements being joined at their open ends to form said chamber, one of said elements being formed of rigid material, the other of said elements being formed of flexible material, a spring within said chamber and having its opposite ends in contact with the base walls of said elements to urge said elements in opposite directions, a fitting carried by one of said elements and having a passage communicating at one of its ends with said chamber, the opposite end of said passage having a valve seat in communication therewith, said fitting being secured to said element at one of its ends and having at its opposite end means for receiving a valve to be tested.

2. A valve tester comprising a support, a cup-shaped member formed entirely of flexible material and supported on said support, a second cup-shaped member formed entirely of rigid material, said cup-shaped members having their open ends joined together to form a chamber, a yielding member in said chamber and having its opposite ends exerted against said cup-shaped members to urge the same in opposite directions, a fitting member carried by said rigid cup-shaped member for movement therewith against the action of said spring, said fitting member having a passage communicating at one end with the area within said cup-shaped member and having a valve seat at its opposite end, said fitting, valve seat and rigid cup-shaped member being movable toward said support against the action of said spring to compress said flexible cup-shaped member and thereby to reduce the area of a chamber formed by said cup-shaped member.

3. A valve tester comprising a support, a cup-shaped member formed entirely of flexible material and supported on said support, a second cup-shaped member formed entirely of rigid material, said cup-shaped members having their open ends joined together to form a chamber, a yielding member in said chamber and having its opposite ends exerted against said cup-shaped members to urge the same in opposite directions, a fitting member carried by said rigid cup-shaped member for movement therewith against the action of said spring, said fitting member having a passage communicating at one end with the area within said cup-shaped member and having a valve seat at its opposite end, said fitting, valve seat and rigid cup-shaped member being movable toward said support against the action of said spring to compress said flexible cup-shaped member and thereby to reduce the area of a chamber formed by said cup-shaped member, and a pressure gauge secured to said fitting and communicating with said passage between said rigid cup-shaped member and said valve seat, said gauge being movable with said fitting and said rigid member towards said support.

4. A manually operable valve tester comprising a support, a flexible cup-shaped member seated upon said support and having its open end extending above said support, a rigid cup-shaped member having its open end secured to the open end of said flexible cup-shaped member, yielding means compressed within and between said cup-shaped members, a fitting secured to said rigid cup-shaped member and extending upwardly thereabove, a passage in said fitting communicating at one of its ends with the area within said cup-shaped members and communicating with a valve seat at its opposite end in said fitting, a receptacle formed and adapted to receive a valve member at said opposite end of said fitting, said rigid cup-shaped member fitting and receptacle being manually movable towards said support against the action of said spring and to compress said flexible cup-shaped member.

References Cited in the file of this patent

UNITED STATES PATENTS

| 1,464,817 | Hammett | Aug. 14, 1923 |
| 1,703,824 | Justice | Feb. 26, 1929 |
| 2,330,236 | Peters | Sept. 28, 1943 |
| 2,449,053 | Burns | Sept. 14, 1948 |
| 2,625,033 | Adair | Jan. 13, 1953 |
| 2,760,367 | Stromberg | Aug. 28, 1956 |

FOREIGN PATENTS

| 391,218 | Great Britain | Apr. 24, 1933 |